Oct. 27, 1964   M. MAYRATH   3,154,037
APPARATUS FOR ANCHORING THE SEAMS OF LOCK SEAM TUBING
Filed Dec. 13, 1960
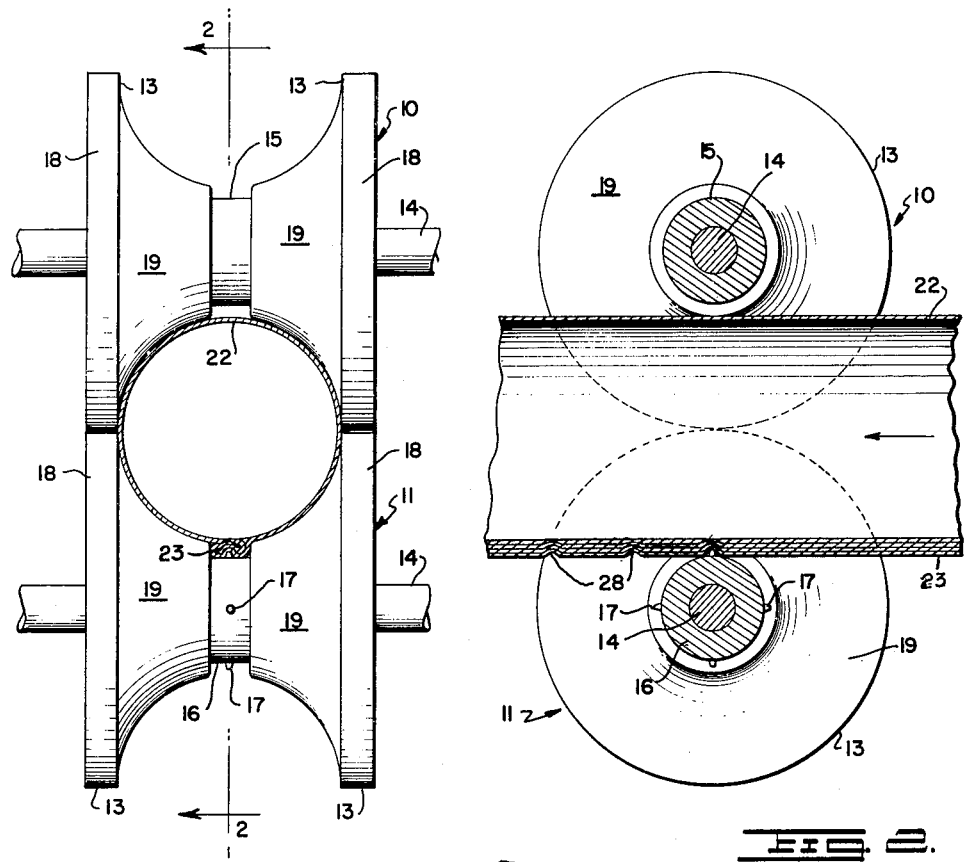
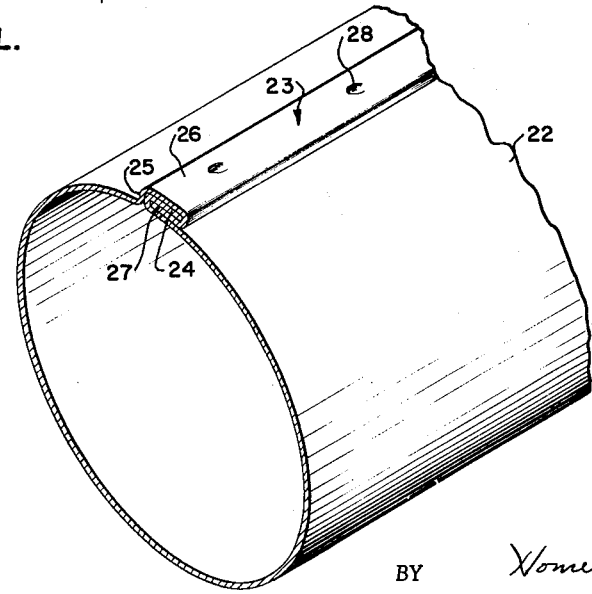
INVENTOR
MARTIN MAYRATH
BY Homer R. Montague
ATTORNEY

United States Patent Office 3,154,037
Patented Oct. 27, 1964

3,154,037
APPARATUS FOR ANCHORING THE SEAMS OF LOCK SEAM TUBING
Martin Mayrath, 10707 Lennox Lane, Dallas 29, Tex.
Filed Dec. 13, 1960, Ser. No. 75,546
2 Claims. (Cl. 113—34)

This invention relates to an apparatus for anchoring the seams of lock seam tubing.

It is a common practice to form tubing of sheet material curved into tubular form and provided with lock seams to join the edges of the sheets. Such tubing is used for many purposes, such as flues, spray booms for spraying crops, for housing spiral conveyors, etc. For some uses the finished tubing is subjected to stresses other than those for which the original lock seam was designed, in which case the seam may slip, causing the tube to twist or bend. Such a stress would be caused, for example, by supporting an engine or motor on the side of the tube. In some cases the seam may slip due to the use of material which has a tendency to spring back after the seam is bent to finished shape.

An important object of the present invention is to provide an apparatus for displacing the metal of a lock seam so as to cause the overlapping layers of the metal to be fixed with respect to each other to prevent the unlocking or sliding of the seam elements.

A further object is to provide an apparatus wherein the smooth cylindrical shape of the inner surface of a tube of this character is undisturbed by the practice of the method, thus making it highly desirable for use as a conveyor tube either of the gravity type or one provided with a spiral conveyor.

A further object is to provide an apparatus of the character referred to wherein the operation of displacing or distorting the metal of the seam is carried out without the necessity for using mandrels or any other backing elements within the tube, thus allowing the method to be carried out very rapidly and at very low cost.

A further object is to provide an apparatus in which the distortion or displacing of the metal of the tube seam takes place at successive spaced points while continuously moving the tube endwise.

A further object is to provide an apparatus for fixing the seams of lock seam tubes by supporting the tube against distortion from its circular cross sectional shape in a plane transverse to the tube and then distorting the metal of the seam in such plane to effect an embedding of layers of the seam with respect to successive inner layers, the supporting of the tube in its normal circular shape allowing the exertion of the pressure necessary for effecting the metal distorting operation.

A further object is to provide an apparatus for performing the operation referred to wherein rollers are provided between which the tube is progressively axially moved, the rollers being so shaped as to embrace the tube transversely thereof to prevent its distortion, one of the rollers being provided with projections for effecting distortion of the metal of the seam of the tube as the latter is moved between the rollers.

Other objects and advantages of the invention will become apparent during the course of the following description.

In the drawings I have shown one embodiment of the invention. In this showing:

FIGURE 1 is a side elevation of the tube embracing and supporting rollers, the lock seam tube being shown in position between the rollers;

FIGURE 2 is a section on line 2—2 of FIGURE 1; and

FIGURE 3 is a sectional perspective view of a portion of a lock seam tube after it has been passed between the rollers.

Referring to FIGURES 1 and 2, the numerals 10 and 11 designate a pair of rollers as a whole, each of which is shown in the present instance as being provided with sections 13 which may be separated centrally thereof for a purpose to be described. Each roller is supported on a shaft 14 journaled in suitable bearings (not shown), and both rollers are preferably positively driven by any suitable transmission means. The sections of the roller 10 are provided therebetween with a spacer 15 while the sections of the lower roller 11 are provided with a spacer 16 having radial projections 17 extending therefrom. The spacer 16 is of smaller diameter than the adjacent portions of the sections 13 of the lower roller 11 for a purpose to be described. The roller sections have outer annular flanges 18, each of which substantially contacts with the adjacent flange 18 so that the space between the rollers is closed at the side thereof. Inwardly of the flanges 18, the rollers are provided with portions 19 projecting toward each other and so curved that a plane passing through the axes of the shafts 14 defines between the rollers substantially a true circle as clearly shown in FIGURE 1, except at the centers of the widths of the rollers which are provided with the spacers 15 and 16. The spacer 15, if desired, may have its surface curved to form a continuation of the inwardly projecting roller portions 19 of the roller 10 or it may be omitted completely and such roller sections 19 may contact with each other centrally of the width of the roller 10. If desired, of course, the roller 10 may be made integral, with the curvature of the portions 19 continuous from side to side of the roller.

The apparatus is adapted to be used in conjunction with a conventional lock seam tube indicated by the numeral 22. Such tube is formed of a sheet of material shaped on any desired tube forming machine to form a lock seam 23. This seam is formed by bending one extremity 24 of the sheet back upon itself in spaced relation to the body of the sheet. The other edge of the sheet is offset outwardly as at 25 and then extended circumferentially as at 26 over the top of the tube edge 24, and then turned inwardly as at 27 under the edge 24. Such a seam, when properly formed, locks the sheet edges to form the tube, this form of seam being old and well known. The seam is not designed, however, to accept without damage unusual stresses and strains of the type referred to above, and it is possible that elements of the seam could slip with respect to each other either by opening the seam or sliding endwise to distort the shape of the tube. The present apparatus is designed to overcome this difficulty and to so fix the elements of the seam with respect to each other as to preserve the true cylindrical shape of the tube from end to end. To accomplish this result the projections 17, as the tube passes between the rollers, distort the metal of the seam to form dimples 28. The projections substantially displace the metal of the outer seam element 26, causing it to press into and displace metal of the seam element 24. This element in turn displaces metal from the seam element 27 into the adjacent body portion of the tube material.

*Operation*

It will be apparent that the structure of the rollers is such as to substantially surround the tube in snug accurately fitting contact therewith, there being substantially a true circle defined between the rollers 10 and 11 corresponding to the external diameter of the tube, as will be apparent in FIGURE 1. The tube is inserted between the rollers, as also shown in FIGURE 1, and the width and depth of the space between the portions 19 of the lower roller 11 and radially outwardly of the spacer 16 correspond to the dimensions of the radially outwardly projecting portion of the seam 23. When the tube is so inserted between the rollers, the driving of the rollers causes them to frictionally engage the tube to feed it therebetween axially of the tube as indicated by the arrow in FIGURE 2. As the rollers are driven, successive projections 17 come into contact with the seam of the tube as shown in FIGURE 2 to displace the metal of successive layers of the seam to form the locking dimples 28. Any desired number of the projections 17 may be employed around the spacer 16 to determine the spacing of the dimples 28, and this spacing will be determined by the nature of the tube and the use to which it is to be put.

As indicated above, each projection, when it contacts with the tube, deforms the seam element 26 at its outer face to an extent equal to the radial depth of the projections. The deforming of the metal is such that there is a slight flow of metal away from each projection so that the inner surface of the seam element 26 is deformed from its true shape to an extent slightly less than the degree of deformation of the outer surface. The seam element 26, in radial alignment with each projection, deforms the seam element 24 in the same way, the outer surface of such element being deformed to a slightly greater extent than the inner face of such element. This progressively decreasing deformation of successive layers of the seams is such that the inner surface of the tube has its smooth continuity completely undisturbed where such result is desired, for example in a conveyor or tube where it is necessary for the inner surface of the tube to remain truly cylindrical.

It will be noted that the rollers have their surfaces contacting the tube along lines lying in the plane of the axes of the shafts 14, that is a plane transverse to the axis of the tube. The force exerted by each projection 17 is directly in such plane, and the tendency for such force to deform the tube to cause the seam to ride over each projection 17 is thus prevented. The snug embracing of the tube prevents any portion thereof from sliding over the roller surfaces away from the seam, and any bulging of the tube to accommodate the force of the projections 17 is prevented. Accordingly the tube emerges from the rollers in true circular shape. The method involved in the present case lies in the transmission of a force to the seam tube in the exact transverse plane in which the tube is embraced by the rollers to prevent distortion thereof. The present method and apparatus are of such nature that the use of any element projecting into the tube to back it up against the force exerted by the projections 17 is unnecessary. The use of a mandrel or other back-up element is not only time consuming but its use is extremely difficult in tubes of substantial length. Obviously a long section of tube can be moved relatively rapidly through the rollers and the present method and apparatus thus can be practiced very rapidly and economically.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A mechanism for anchoring with respect to each other successive layers of the seam of a lock seam hollow tube which comprises a pair of rollers mounted on parallel axes and provided with annular surfaces defining therebetween in the plane of said axes substantially a circle corresponding in diameter to the tube whereby such tube is movable between said rollers while being supported solely thereby against radially outward distortion, one of such rollers being formed as coaxial sections having adjacent ends spaced from each other a distance approximately equal to the width of the seam, an annular spacer arranged between such sections coaxially therewith and of smaller diameter than said adjacent ends of said sections to accommodate the tube seam as to its depth whereby as said one roller is rotated, the tube is movable axially through the space between said rollers, and means carried by said spacer for deforming spaced depressions in the outer and successive layers of the seam of the tube to prevent relative sliding movement between such layers.

2. A mechanism for anchoring with respect to each other successive layers of the seam of a lock seam hollow tube which comprises a pair of rollers mounted on parallel axes and provided with annular surfaces defining therebetween in the plane of said axes substantially a circle corresponding in diameter to the tube whereby such tube is movable between said rollers while being supported solely thereby against radially outward distortion, one of such rollers being formed as coaxial sections having adjacent ends spaced from each other a distance approximately equal to the width of the seam, an annular spacer arranged between such sections coaxially therewith and of smaller diameter than said adjacent ends of said sections to accommodate the tube seam as to its depth whereby as said one roller is rotated, the tube is movable axially through the space between said rollers, and a plurality of circumferentially spaced radial projections carried by said spacer to rotate with said one roller and engage against successive spaced points along the seam of the tube to deform the outer and successive layers of the seam to prevent relative sliding movement of such layers.

References Cited in the file of this patent

UNITED STATES PATENTS

| | | |
|---|---|---|
| 1,184,947 | Gossett et al. | May 30, 1916 |
| 1,905,839 | Forbregd et al. | Apr. 25, 1933 |
| 2,012,889 | McIntyre | Aug. 27, 1935 |
| 2,677,765 | Collins et al. | May 4, 1954 |
| 2,688,890 | Williams | Sept. 14, 1954 |
| 2,736,284 | Jacokes | Feb. 28, 1956 |

FOREIGN PATENTS

| | | |
|---|---|---|
| 718,482 | Great Britain | Nov. 17, 1954 |